United States Patent Office 3,079,336
Patented Feb. 26, 1963

3,079,336
ALCOHOLS IN CONJUNCTION WITH WATER THICKENERS FOR A SECONDARY RECOVERY PROCESS
Paul L. Stright, Buffalo, N.Y., and Albin F. Turbak, New Providence, N.J., assignors to Jersey Production Research Company, a corporation of Delaware
No Drawing. Filed Mar. 22, 1960, Ser. No. 16,663
7 Claims. (Cl. 252—8.55)

The present invention is broadly concerned with a secondary recovery operation or process for obtaining oil from subterranean reservoirs. The invention is more particularly directed to a secondary recovery procedure wherein a fluid such as water is employed as a driving medium and wherein various types of water thickening agents are utilized to increase the viscosity of the water so as to prevent fingering in the oil reservoir. The invention particularly is directed toward the use of alcohols in conjunction with these water thickening agents in order to improve thermal stability. A particularly desirable process comprises the use of alcohols such as methanol in conjunction with thickening agents selected from the class of vinyl aromatic maleic anhydride copolymers.

In the recovery of oil from subterranean reservoirs, there have been substantial advances in primary recovery techniques so as to substantially increase the recovery of oil. However, an appreciable quantity of the oil remains in the reservoir after termination of the primary recovery methods. In general, it is estimated that only about 10 to 30% of the oil can be economically recovered by primary recovery techniques. A greater amount may be recovered by other secondary techniques, such as repressuring treatments following the primary method.

Thus, there exists a great interest in secondary recovery methods. Secondary recovery is the recovery of additional quantities of oil from a reservoir after it is no longer economical to recover oil by primary recovery methods. For example, a secondary operation may be conducted by drilling one or more injection wells into a permeable oil bearing formation within suitable proximity to a producing well or wells which are drilled into this same permeable oil bearing formation. Injection of liquids or gases through the injection well is generally effective in increasing the oil production from the producing well or wells. This technique of secondary recovery enables the recovery of substantially more oil than can be produced by primary recovery methods.

As pointed out, the use of a number of secondary recovery procedures for removing oil from subterranean oil reservoirs are well known in the petroleum industry. It is the function of such procedures to make possible the recovery of oil from reservoirs after primary production methods are uneconomical. In general, all secondary recovery procedures employ a driving medium such as a liquid or gas for displacing additional oil from a reservoir. The displacing medium, usually a fluid, is injected in a reservoir as by means of one or more of the original wells or by means of entirely new wells; and the oil in the reservoir is displaced toward and withdrawn from other remaining wells.

Due partially to its ready availability in many regions, water has been extensively employed as a driving medium in secondary oil recovery programs.

While conventional waterflooding is effective in obtaining additional oil from subterranean oil reservoirs, it has a number of shortcomings which detract seriously from its value. Foremost among these shortcomings is a tendency of flood water to "finger" through a reservoir and to bypass substantial portions of the reservoir. In other words, a water drive has a less than perfect "sweep efficiency" in that it does not contact all portions of the reservoir. Furthermore, it does not normally displace as much oil in the portions of the reservoir which it contacts as it theoretically is capable of doing.

The fingering tendency of a waterflood is usually explained by the fact that oil reservoirs possess regions and strata that have different permeabilities. The water flows more rapidly through those regions and strata having a greater relative permeability to water than in other portions of the reservoir. Waterflooding often completely misses substantial portions of the reservoir. The net result is an inefficient oil displacement action on the part of the water.

At this point, it should be noted that crude oils vary greatly in viscosity—some being as low as 1 or 2 cps. and some ranging up to 1,000 cps. or even more. It has been established that waterflooding performs less satisfactorily with viscous crude oils than with relatively non-viscous oils. In other words, the fingering and bypassing tendencies of the water drive are more or less directly related to the ratio of the viscosity of the reservoir oil to the viscosity of the aqueous driving medium.

Also of interest at this point is a mathematical relationship that has been developed in recent years to help explain the behavior of fluids flowing through porous media such as oil reservoirs. When this equation is applied to a flooding operation or the like within an oil reservoir, it reads as follows:

$$\frac{M_o}{M_e} = \frac{\mu_e}{\mu_o}, \frac{K_o}{K_e}$$

where $M_o$ is the mobility of the oil to the reservoir in question
$M_e$ is the mobility of the flooding medium to the reservoir in question
$\mu o$ is the viscosity of the driven oil
$\mu e$ is the viscosity of the flooding medium
$K_e$ is the relative permeability of the reservoir toward the flooding medium in the presence of residual oil
$K_o$ is the relative permeability of the reservoir toward the oil in the presence of connate water This equation is perhaps best explained by stating that when the mobility ratio of oil to the driving fluid within the reservoir is equal to one, the oil and driving fluid move through the reservoir with equal ease. Substantially equilibrium proportions of driving fluid and oil remain within the reservoir as soon as the driving fluid has passed therethrough. Expressed otherwise, the mobility ratio term affords a measure of the volume of driving fluid and the amount of time that is required to reduce the oil content of the reservoir to an ultimate equilibrium value. For example, a given volume of driving fluid operated at a mobility ratio of one or greater will displace a markedly greater volume of oil from a reservoir than will an equal volume of driving fluid operating at a mobility ratio of less than one.

Several procedures have been suggested to date for improving the mechanics of waterflooding procedures particularly with the view to reducing the degree of fingering and bypassing. One suggestion has been to increase the viscosity of the water drive relative to the oil by incorporating water soluble viscous agents within the water. Materials that have been suggested for this purpose include a wide variety of naturally occurring gums, sugars and polymers. While these materials are effective to an extent in increasing the viscosity of flood water, they are also characterized by serious disadvantages. For example, some of the materials have a tendency to plug formations; some are relatively unstable; and some have relatively little thickening effect. Additionally many of these materials are quite expensive and their use is not feasible from the standpoint of economics.

Accordingly, it is an object of this invention to provide an improved type of displacement process in which a marked increase in the viscosity of the driving fluid may be readily attained. It is also an object of the invention to provide a viscous "waterflooding" process in which the increased viscosity of the flood water is attained inexpensively. It is still a further object of the invention to use a driving fluid whose viscosity is stable. This is attained by the utilization of alcohols in conjunction with water thickening agents. Low molecular weight, water soluble alcohols, such as methyl alcohol, ethyl alcohol, isopropyl alcohol, n-propyl alcohol, and the like, are desirable.

The process of the present invention may be more readily understood by the following examples illustrating embodiments of the same.

EXAMPLE 1

A styrene-maleic anhydride copolymer [1] and a half-methyl ester derivative of that copolymer were each dissolved in reservoir [2] water and NaOH. These solutions (0.5%) were each divided into two portions, and 1% by volume methanol was added to one portion and not the other. These solutions were then tested for viscosity retention, while refluxing at 212° F. in a nitrogen atmosphere. The data below demonstrate the increased viscosity retention obtained when methanol was present.

| Compound | Methanol Added | Initial Viscosity a | Percent Viscosity Retained After— | |
|---|---|---|---|---|
| | | | 24 Hours | 264 Hours |
| Anhydride | No | 7.2 | 42 | 22 |
| Do | Yes | 7.3 | 59 | 41 |
| Methyl ester | No | 4.3 | 154 | 58 |
| Do | Yes | 4.3 | 186 | 105 | a Measured with Brookfield viscometer—U.L. adapter at 30 r.p.m.

This increased viscosity retention was also observed (1) when methanol was added during the preparation of the reservoir water solution of the polymers, and (2) when methanol was added after the solution had been refluxed for 24 hours.

From the above, it is apparent that the methanol substantially improved the viscosity retention of the water thickening agent.

---

[1] A styrene maleic anhydride copolymer having a molecular weight in excess of 200,000.
[2] Reservoir water = 40 liters of water, contains 2.72 grams sodium bicarbonate, 4.28 grams sodium sulfate, 5.52 grams magnesium chloride, 3.56 grams calcium chloride, 36.5 grams sodium chloride and 2.05 grams aluminum sodium sulfate ($Al_2(SO_4)_3 Na_2SO_4 \cdot 24H_2O$).

EXAMPLE 2

The following data were obtained from a 0.3% solution of a sulfonated [3] polystyrene in reservoir water. One percent methanol by volume was added. The solutions were aged at 212° F. in the presence of a nitrogen atmosphere.

| N.B. 1458 | Methanol Added | Initial Viscosity a | Percent Viscosity Retained After— | |
|---|---|---|---|---|
| | | | 3½ Hours | 27 Hours |
| 23-1 | No | 9.1 | 57 | 42 |
| 23-2 | Yes | 9.1 | 111 | 121 | a Brookfield viscosity, cp., 60° C., 30 r.p.m., U.L. adapter.

From the foregoing, it is apparent that the viscosity retention of sulfonated polystyrene solutions is greatly improved by the addition of methanol.

EXAMPLE 3

*Effect of Methanol on Thermal Stability of Polymer Solutions*

| Polymer | N.B. Ref. 1458 | Conc. a | Methanol Added b | Initial Viscosity c | Percent Viscosity Retained After Refluxing (Hours) | | | | | |
|---|---|---|---|---|---|---|---|---|---|---|
| | | | | | 24 | 48 | 96 | 240 | 336 | 672 |
| Polyacrylic Acid (R.V.=18.5) | 23-5 | 0.4 | No | 15.2 | 68 | 59 | | 26 | | 14 |
| | 23-6 | 0.4 | Yes | 15.1 | 91 | 89 | | 70 | | 48 |
| Styrene-Methacrylic Acid Copolymer (1:2). | 25-2 | 0.25 | No | 12.1 | 44 | 39 | | | | |
| | 25-3 | 0.25 | Yes | 12.3 | 130 | d 322 | | | | |
| Polyethylene oxide (Polyox301) | 23-7 | 0.5 | No | 14.0 | 31 | | 23 | | 19 | |
| | 23-8 | 0.5 | Yes | 14.2 | e 70 | | 63 | | 57 | | a Percent by weight in reservoir water.
b Added 1.0% by volume absolute methanol.
c Brookfield viscosity (cp., 60° C., 30 r.p.m., U.L. Adapter).
d Gel precipitated from both solutions before 120 hours.
e Aging data is for 60° C. in oven, rather than at reflux temperature. Polymer precipitates from refluxing solution.

From the foregoing, it is apparent that the viscosity retention of polymer solutions, containing polymers of widely varying types, is improved by the addition of methanol.

The invention is broadly concerned with the use of alcohols, particularly, low molecular weight alcohols for the stabilization of viscosity of thickened polymer solutions for use in a secondary water flooding operation. Generally, the alcohols are mono-hydroxy alcohols wherein the number of carbon atoms is in the range from about 1 to 6. The alcohols are used in a concentration by weight in the range from 0.1 to 5.0%, preferably, in the range from 0.1 to 1.0%. Particularly desirable alcohols are, for example, methanol and isopropanol.

The alcohols are employed in conjunction with water thickening agents which generally are of the carboxylic acid type polymer. Other satisfactory polymers, for example, polyethylene oxides, polyvinylaromatic sulfonates, polyacrylic and polymethacrylic acids and derivatives, and polyvinyl alcohols, are made more stable by the addition of alcohols.

As pointed out heretofore, satisfactory compounds are copolymers of vinyl aromatics and maleic anhydride. These compounds are produced by copolymerizing vinyl aromatics, such as styrene, vinyl toluene, vinyl naphthalene and the like with maleic anhydride. These materials are obtained in high molecular weights by using azo-bis-isobutyronitrile as catalyst, and polymerizing at low temperatures, such as 30°–60° C. Other catalysts can be used, such as benzoyl peroxide and cumene hydroperoxide. The viscosity of aqueous solutions have im-

---

[3] A sulfonated polystyrene polymer having a molecular weight in excess of about 200,000.

proved salt sensitivity and heat stability as compared to other polyelectrolytes.

Specific vinyl aromatics exemplifying monomers that may be copolymerized with maleic anhydride are as follows: styrene, vinyl toluene, α-methyl styrene, p-chlorostyrene, dichlorostyrene, vinylnaphthalene, trans-stilbene, α,α-diphenylethylene, iso-allylbenzene, vinylcarbazole and vinyl ferrocene.

The styrene was copolymerized with maleic anhydride in methyl ethyl ketone at 60° C. using 0.036 gram of azo-bis-isobutyronitrile as catalyst per mole of monomers. The copolymer was precipitated from methyl ethyl ketone solution with methanol, and then hydrolyzed by dissolving in dilute aqueous sodium hydroxide.

The molecular weights of the polymers of the present invention should be in excess of about 100,000. In general, preferred polymers should be above about 500,000, preferably, above 1,000,000. The molecular weights may be as high as 3,000,000 to 5,000,000, or up to 10,000,000 and higher. When a polymer has a molecular weight in the range from 500,000 to 1,000,000, it should be used in the concentration of less than about 1% by volume, preferably, in the range from 0.1 to 0.5% by volume. A desirable concentration is 0.2% by weight.

Other satisfactory thickening agents for use in conjunction with the alcohols of the present invention are copolymers of:

(1) Acrylic acids
(2) Low molecular weight aliphatic olefins
    $C_3$–$C_4$ olefins Copolymers of acrylic acids or substituted acrylic acids with low molecular weight aliphatic olefins or substituted low molecular weight aliphatic olefins.

The class of polymers claimed in this invention are prepared by copolymerizing an acrylic type acid with a mono-olefin. The mono-olefin can be propylene, ethylene, isobutylene, and may be represented by the following formula:

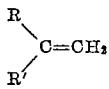

wherein R and R' represent hydrogen or alkyl groups. The alkyl group may contain from 1 to 10 carbon atoms and preferably 1 to 6 carbon atoms. The acrylic type acid may be acrylic acid, or methacrylic acid and may be represented by the following structural formula:

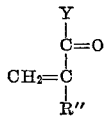

wherein R'' represents either hydrogen or an alkyl group containing from 1 to 10 carbon atoms. Y represents a water solubilizing group as, for example, OH, ONa, $ONH_4$ and $NH_2$. If the group comprises a hydroxy group, this may be substituted in part by OR, as long as water solubility remains. The resulting polymer is represented by the following formula:

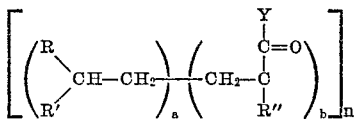

wherein the $a$ to $b$ ratio is not greater than 4:1, and preferably, wherein the $a$ to $b$ ratio is about 1:1, and wherein $n$ is of a value to give the desired molecular weights as described herein.

Other satisfactory polymers are copolymers of acrylic acid as, for example, methacrylic acid in conjunction with a vinyl aromatic, such as styrene and vinyl toluene.

Copolymers claimed in this invention can be described by the following general structural formula:

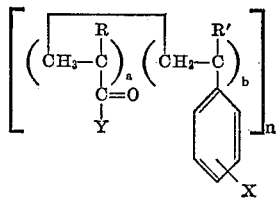

where R and R' are hydrogen, alkyl or aryl.

X=H, alkyl such as ethyl or methyl, Cl, $CH_3O$, C≡N, OH, $SO_3H$ and $CO_2H$.

Y=OH, ONa, $ONH_4$, $NH_2$ or any other group imparting water solubility. If Y=OH, part of the group may be OR where R=an alkyl group such as methyl or ethyl as long as water solubility is maintained.

$n$=degree of copolymerization and equals at least 50 and may be as high as 100,000 or more.

$a/b$=the ratio of the monomers in the polymer and may cover the entire range composition range as long as the product is water soluble. Polymers below 0.5/1 are believed to have little interest.

Specific compounds falling in the above-identified class are copolymers of acrylic acid and styrene, acrylic acid and methyl styrene (vinyl toluene), methacrylic acid and styrene and methacrylic acid and methyl styrene (vinyl toluene).

Other satisfactory polymers are copolymers of maleic anhydride and vinyl aromatics in conjunction with alcohol adducts. A particular polymer of this category comprises a copolymer of maleic anhydride and styrene in conjunction with an alcohol adduct of methanol, ethanol and isopropanol.

A particular type of water thickening agent for use in conjunction with the alcohols of the present invention are sulfonated polymers. Compounds have the following structural formula:

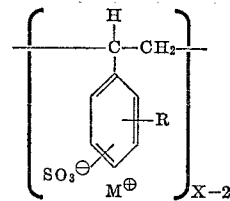

where:

R represents H, $CH_3$ or a group for which the Hammett function is known or readily determinable. (See Physical Organic Chemistry by J. Hine, published by Wiley and Company, New York.)

(X) represents the degree of polymerization and has values such that the molecular weight of the resulting polymer is greater than 100,000.

$M^\oplus$ represents a cationic salt component and may be $Na^\oplus K^\oplus$, $Li^\oplus$, $NH_4^\oplus$, $CH_3NH_3^\oplus$, $C_2H_5NH_3^\oplus$, $C_3H_7NH_3^\oplus$, $C_4H_9NH_3^\oplus$, $C_5H_{11}NH_3^\oplus$

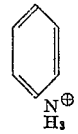

or other ammonium derivatives.

The relative substituent position of R to —$SO_3^\ominus M^\oplus$ to the styryl group is considered to be non-limiting except by reason of ease of preparation. Thus, for example, in the case of polyvinyl toluene sulfonate prepared by polymerization of a mixed ortho and para vinyl toluene monomer, as is generally commercially supplied, the sulfonate would enter respective positions along the chain in accordance with the generally well established rules of organic chemistry; each position being determined by the relative positions already occupied on the aromatic nucleus by the polymer backbone and the methyl group. In the case of polystyrene, the sulfonate would enter ortho and para to the position linked to the polymer backbone.

As pointed out heretofore, these polymers should have molecular weights above 500,000, preferably, above 1,000,000. The molecular weights may be as high as 3,000,000 or up to 10,000,000. The polymer is used in a concentration of less than 1% by volume based upon the volume of water, preferably, in a concentration of 0.1 to 0.5 weight percent. A desirable concentration is about 0.2 weight percent. The concentration of the alcohol employed is in the range from 0.01% by volume to 5% by volume. A preferred concentration for the alcohol is in the range from 0.1 to 1.0% by volume.

Other valuable products which can be stabilized by the addition of alcohol are the polymers and adducts of ethylene oxide. Polyethylene oxide has the structure:

$$-(CH_2CH_2O)_x-$$

where $x$ has values such as to give molecular weights in excess of 100,000.

As adducts of ethylene oxide, included are the ethoxylation products of polyxinyl alcohol and of polyacrylamide. These can be prepared by procedures set forth in U.S. Patent No. 1,971,662.

While the present application is primarily concerned with increasing the stability of these polymers in a secondary recovery operation, it is to be understood that the general technique may be utiled to stabilize this class of polymers when used in any type of process or operation.

What is claimed is:

1. An improved process for recovering oil from an oil reservoir which comprises flowing through said reservoir from an input well toward an output well a flood water which has been increased in viscosity by incorporating therein from about 1/10 to 1% of an organic thickening compound having a molecular weight in the range from about 200,000 to 5,000,000 and from about 1/10 to 5% of an aliphatic alcohol having 1 to 6 carbon atoms per molecule, said organic thickening compound being selected from the group consisting of (1) a copolymer of maleic anhydride and a vinyl aromatic, (2) a copolymer of acrylic acid and a low molecular weight olefin, (3) a copolymer of acrylic acid and a vinyl aromatic, (4) a sulfonated polyvinyl aromatic, (5) a polymer of ethylene oxide, and (6) polyacrylic acid.

2. A process as defined by claim 1 wherein said organic thickening compound is a copolymer of maleic anhydride and a vinyl aromatic, and wherein said alcohol is selected from the group consisting of methanol and isopropanol.

3. A process as defined by claim 1 wherein said organic thickening compound is a copolymer of acrylic acid and a low molecular weight olefin.

4. A process as defined by claim 1 wherein said organic thickening compound is a copolymer of acrylic acid and a vinyl aromatic.

5. A process as defined by claim 1 wherein said organic thickening compound is a sulfonated polyvinyl aromatic.

6. A process as defined by claim 1 wherein said organic thickening compound is a polymer of ethylene oxide.

7. A process as defined by claim 1 wherein said organic thickening compound is polyacrylic acid.

References Cited in the file of this patent

UNITED STATES PATENTS

| | | |
|---|---|---|
| 2,262,428 | Leitz | Nov. 11, 1941 |
| 2,267,548 | Berl | Dec. 23, 1941 |
| 2,327,017 | Chamberlain | Aug. 17, 1943 |
| 2,341,500 | Detling | Feb. 8, 1944 |
| 2,808,109 | Kirk | Oct. 1, 1957 |
| 2,827,964 | Sandiford et al. | Mar. 25, 1958 |
| 2,842,492 | Engelhardt et al. | July 8, 1958 |